US011778292B2

(12) United States Patent
Zaperach

(10) Patent No.: US 11,778,292 B2
(45) Date of Patent: Oct. 3, 2023

(54) CAMERA IMAGING SENSOR SHIELD

(71) Applicant: Terry Edward Zaperach, Onancock, VA (US)

(72) Inventor: Terry Edward Zaperach, Onancock, VA (US)

( * ) Notice: Subject to any disclaimer, the term of this patent is extended or adjusted under 35 U.S.C. 154(b) by 0 days.

(21) Appl. No.: 18/112,828

(22) Filed: Feb. 22, 2023

(65) Prior Publication Data
US 2023/0188817 A1    Jun. 15, 2023

Related U.S. Application Data

(63) Continuation-in-part of application No. 17/552,199, filed on Dec. 15, 2021, now abandoned.

(51) Int. Cl.
*H04N 23/52*    (2023.01)
*H04N 23/55*    (2023.01)

(52) U.S. Cl.
CPC .............. *H04N 23/52* (2023.01); *H04N 23/55* (2023.01)

(58) Field of Classification Search
CPC .......... H04N 23/52; H04N 23/55; G03B 9/06; G02B 27/0006
See application file for complete search history.

(56) References Cited

U.S. PATENT DOCUMENTS

| | | | |
|---|---|---|---|
| 2012/0321292 A1* | 12/2012 | Viglione | G03B 9/22 396/458 |
| 2017/0094137 A1* | 3/2017 | Ito | H04N 23/663 |
| 2019/0121219 A1* | 4/2019 | Hwang | G03B 11/043 |
| 2020/0007739 A1* | 1/2020 | Sugiyama | H04N 23/55 |
| 2020/0096841 A1* | 3/2020 | Okada | H04N 23/00 |
| 2020/0259992 A1* | 8/2020 | Ichinose | H04N 23/72 |
| 2022/0252960 A1* | 8/2022 | Devine | G03B 9/06 |

OTHER PUBLICATIONS

Fotodiox. "Amazon.com : Fotodiox Pro Iris Lens Mount Adapter Compatible with . . ." Amazon, Dec. 29, 2012, https://www.amazon.com/Fotodiox-Lens-Mount-Adapter-Mount/dp/B00AUKDRGO. (Year: 2012).*

* cited by examiner

*Primary Examiner* — Clayton E. LaBalle
*Assistant Examiner* — Diana Hancock
(74) *Attorney, Agent, or Firm* — Dale J. Ream

(57) ABSTRACT

A sensor shield for a digital camera includes a casing and lens locking ring on a front thereof. The sensor shield includes a barrier member removably coupled to the lens locking ring of the camera body and has a ring-shaped configuration that defines an aperture. The sensor shield has a plurality of iris blades that is rotatably movable between a closed configuration in arranged in an overlapping spiral configuration that prevents ambient air from flowing through said aperture and an open configuration at which said plurality of iris blades are arranged in a rotatably displaced configuration that, when actuated, allows ambient air to flow through its aperture. The sensor shield may receive a camera lens and is actuated by rotation thereof such that a spring is compressed and the iris blades are urged from the closed configuration to the open configuration that allows ambient air to pass through.

18 Claims, 13 Drawing Sheets

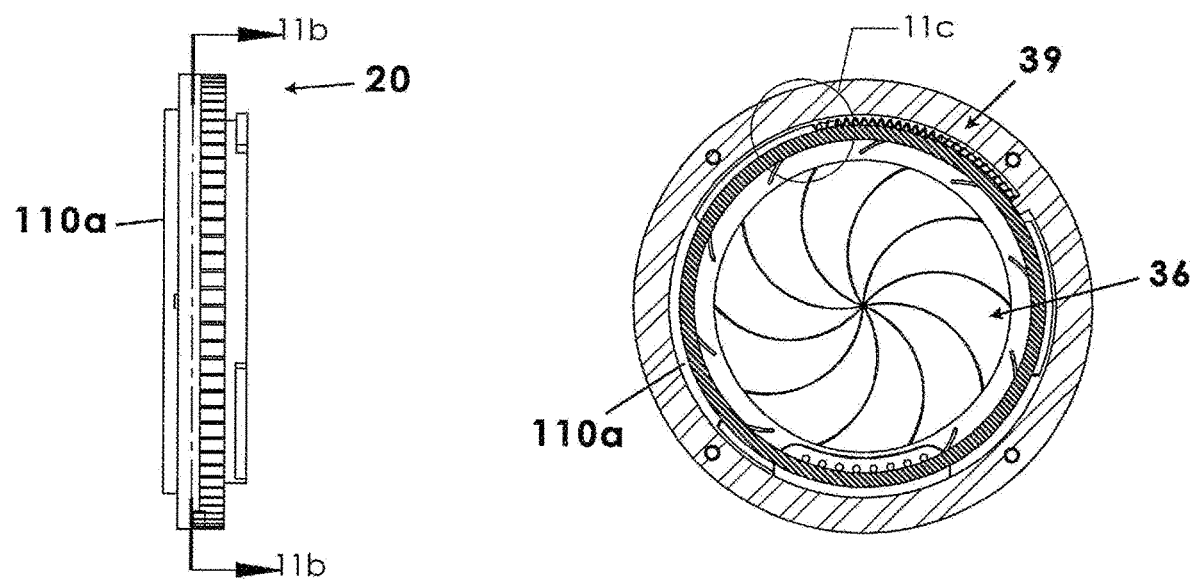
Fig. 11a
Fig. 11b
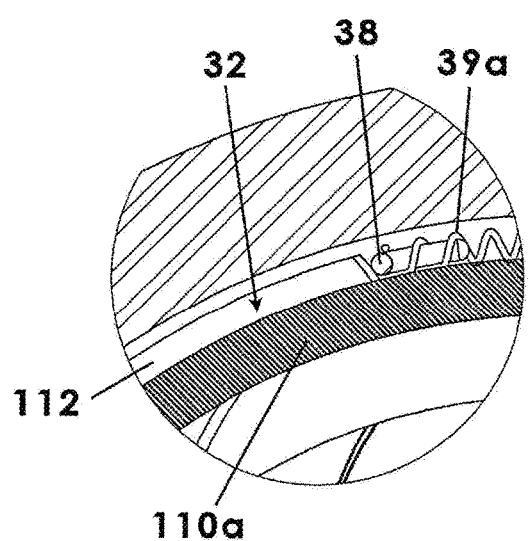
Fig. 11c

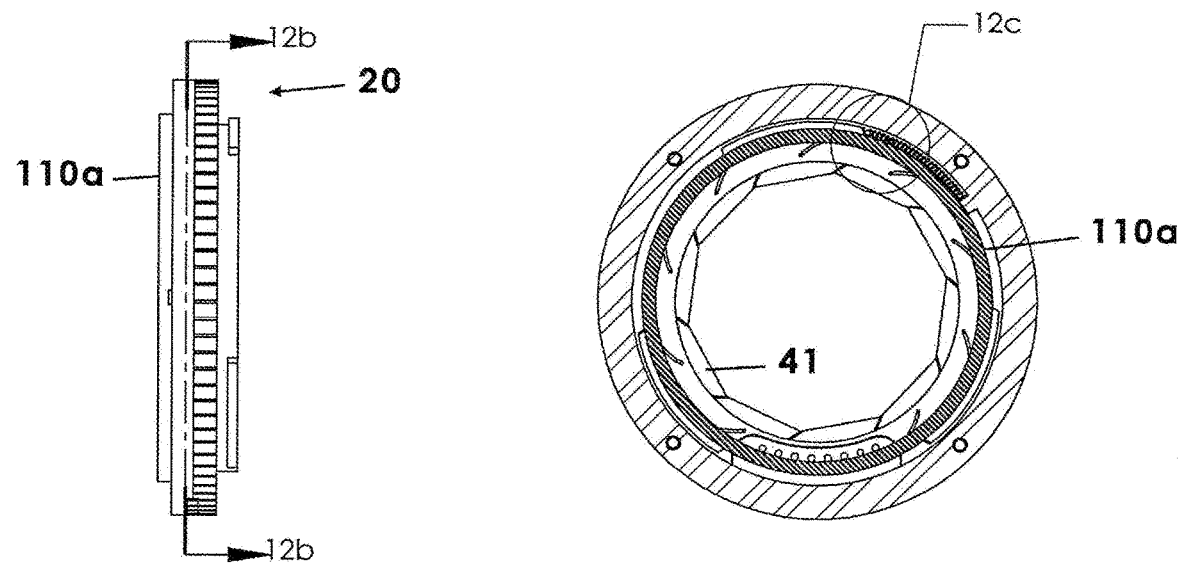
Fig. 12a
Fig. 12b
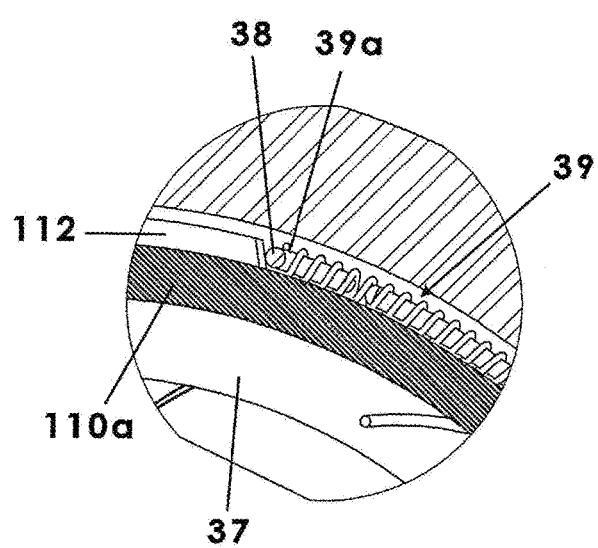
Fig. 12c

CAMERA IMAGING SENSOR SHIELD

REFERENCE TO RELATED APPLICATIONS

This application is a continuation-in-part application that claims the benefit of U.S. patent application Ser. No. 17/552,199 filed Dec. 15, 2021 and titled Z-Camera Imaging Sensor Shield, which is incorporated herein in its entirety.

BACKGROUND OF THE INVENTION

This invention relates generally to digital cameras and, more particularly, to an imaging sensor shield incorporated into the construction of a digital camera for shielding the imaging sensor from dust, dirt, and pollen that may be damaging or degrading to an imaging sensor has a camera and, therefore, to the quality of electronic images.

An imaging sensor is an electronic component inside the digital camera that captures light and converts it into electrical signals which are then processed and result in an image i.e., a photograph. More particularly, a digital sensor includes millions of photosites, i.e., light-sensitive spots that record what is being seen through the camera lens. The image sensor detects and conveys a representation of light waves, when converted to electrical signals, to a processor that is configured to represent them as a picture significantly as it would be interpreted visually by a person.

Unfortunately, the imaging sensor, which is critical to an accurate representation of light being captured through the lens, is very sensitive to dust, dirt, and other contaminants. If not properly shielded, the picture generated by the imaging sensor may look smudged, out of focus, or lead to hours of spotting and retouching. Therefore, it would be desirable to have a sensor shield that is positioned and configured to block and prevent an imaging sensor in a digital camera against the degrading effects of dust, dirt, and other contaminants. A built-in shield consists of an iris directly inside the camera throat.

SUMMARY OF THE INVENTION

A sensor shield assembly according to the present invention is configured for use with a digital camera of a type that includes a camera body having a casing that defines an interior area and that includes a lens locking ring mounted on a front wall of the casing and that defines a void in communication with said interior area. The sensor shield assembly includes a barrier member having a rear surface removably coupled to a front surface of the lens locking ring of the camera body, said barrier member having a ring-shaped configuration that defines an aperture. Further, the sensor shield assembly includes an iris assembly having a plurality of iris blades positioned in said aperture that is rotatably movable between a closed configuration in which said plurality of iris blades are arranged in an overlapping spiral configuration that prevents ambient air from flowing through said aperture and an open configuration at which said plurality of iris blades are arranged in a rotatably displaced configuration that, when actuated, allows ambient air to flow through said aperture. The sensor shield is configured to receive a camera lens and to be actuated by rotation thereof and such that a spring is compressed and the plurality of iris blades are urged from a closed configuration blocking movement of ambient air to an open configuration that allows ambient air to pass through an aperture defined by the sensor shield assembly.

Therefore, a general object of this invention is to provide a camera imaging sensor shield that blocks and protects an imaging sensor from dust, dirt, and other contaminants.

Another object of this invention is to provide a camera imaging sensor shield, as aforesaid, includes an iris having a plurality of iris blades that are normally arranged in an overlapping configuration that prevents ambient air from passing therethrough but that are rotatably and spirally open door hidden so as to allow ambient air to pass through the iris when a camera lens is coupled to the sensor shield.

Still another object of this invention is to provide a camera imaging sensor shield, as aforesaid, that is attachable intermediate a camera factor lens mount ring and a camera lens so as to shield a camera sensor when a camera lens is removed but to allow normal operation of the camera imaging sensor when the camera lens is attached.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2 is a front exploded view of the digital camera and sensor shield assembly as in

FIG. 1;

FIG. 5a is a perspective view of the sensor shield member installed on the camera as in FIG. 4a;

FIG. 5c is a perspective view of the sensor shield member removed and exploded from the camera as in FIG. 5a;

FIG. 6a is a perspective view from a rearwardly tilted angle of the sensor shield member installed on a camera as in FIG. 4a;

FIG. 6b is an isolated view on an enlarged scale taken from FIG. 6a;

FIG. 7b is an isolated view on an enlarged scale taken from FIG. 7a;

FIG. 8b is a rear perspective view of the sensor shield member as in FIG. 8a;

FIG. 9a is an exploded view of the sensor shield member as in FIG. 8a;

FIG. 9b is an exploded view from a reverse angle of the sensor shield member as in FIG. 9a;

FIG. 10b is an isolated view on an enlarged scale taken from FIG. 10a;

FIG. 11a is a side view of the sensor shield member according to the present invention;

FIG. 11b is a sectional view taken along line 11b-11b of FIG. 11a;

FIG. 11c is an isolated view on an enlarged scale taken from FIG. 11b;

FIG. 12a is a side view of the sensor shield member according to the present invention;

FIG. 12b is a sectional view taken along line 12b-12b of FIG. 12a;

FIG. 12c is an isolated view on an enlarged scale taken from FIG. 11b; and

DESCRIPTION OF THE PREFERRED EMBODIMENT

Figure 1:
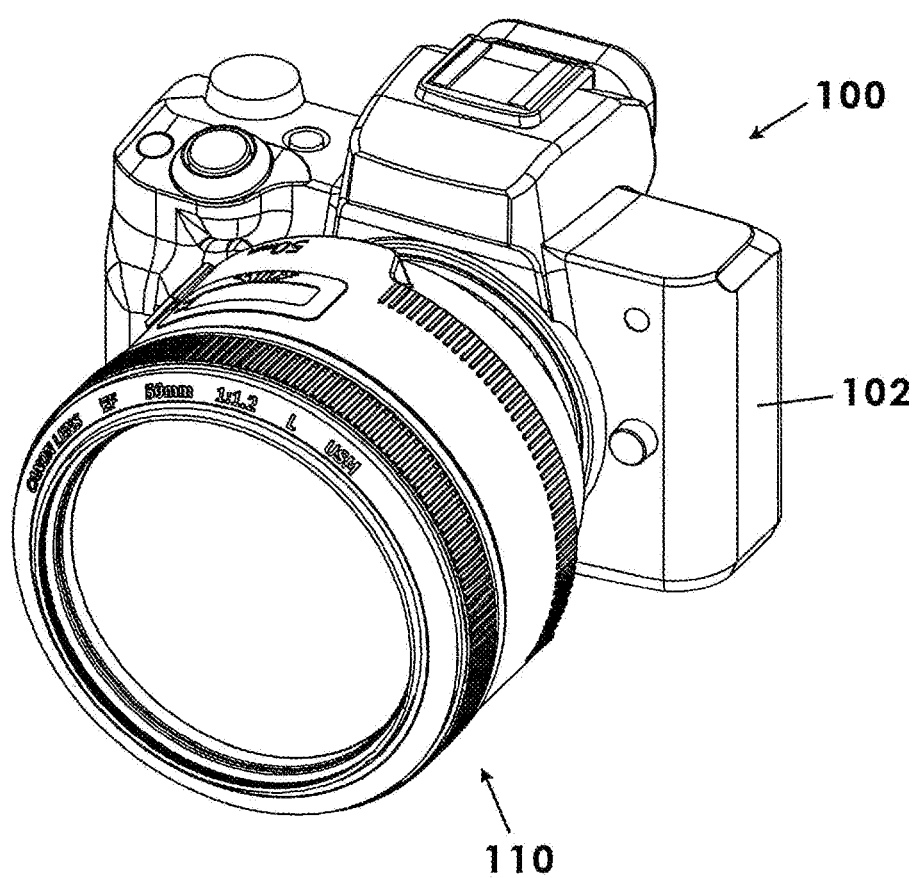
FIG. 1 is a perspective view of a digital camera and lens according to a preferred embodiment of the present invention.
Figure 2:
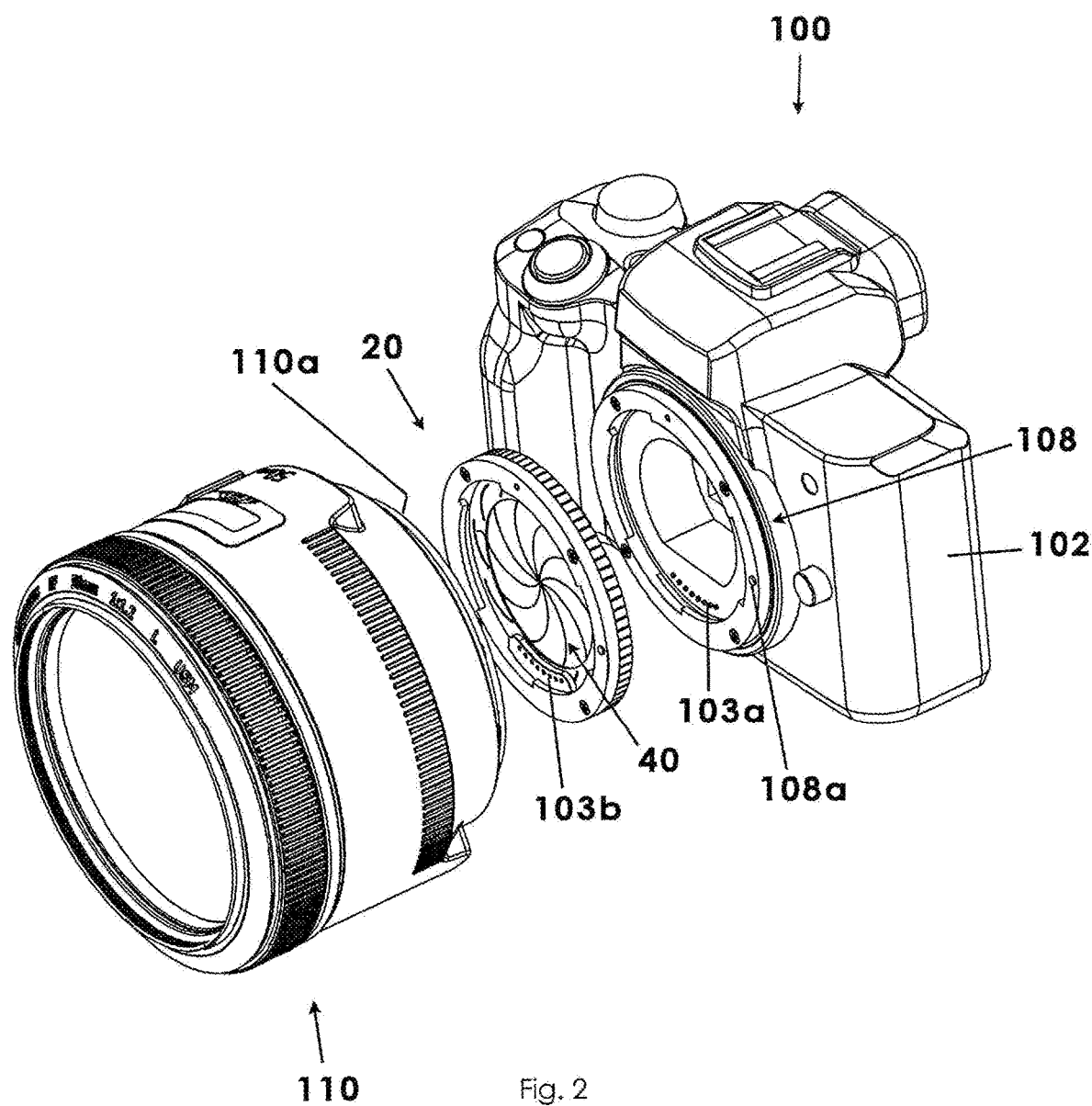

An imaging sensor shield for use on or with a digital camera according to a preferred embodiment of the present invention will now be described with reference to FIGS. 1 to 13 of the accompanying drawings. The imaging sensor shield 10 for a digital camera 100 includes a barrier member 20, and iris assembly 40. The digital camera 100 is illustrated generically and is of a type that includes a camera body or casing 102 having a plurality of walls that define an interior area that houses at least a battery 103, a photosensor 104 configured to receive light waves from the objects being photographed, and appropriate electronics for converting the received light waves into a photograph. The construction and configuration of the digital camera 100, including the sensor electronics, are not new nor modified by the present invention and are understood by one of ordinary skill in the art of manufacturing camera equipment. It is understood that the imaging sensor shield 10 according to the present invention is configured to be utilized with a digital camera or, in fact, be manufactured, marketed, and sold along with the digital camera 100.

Figure 3:
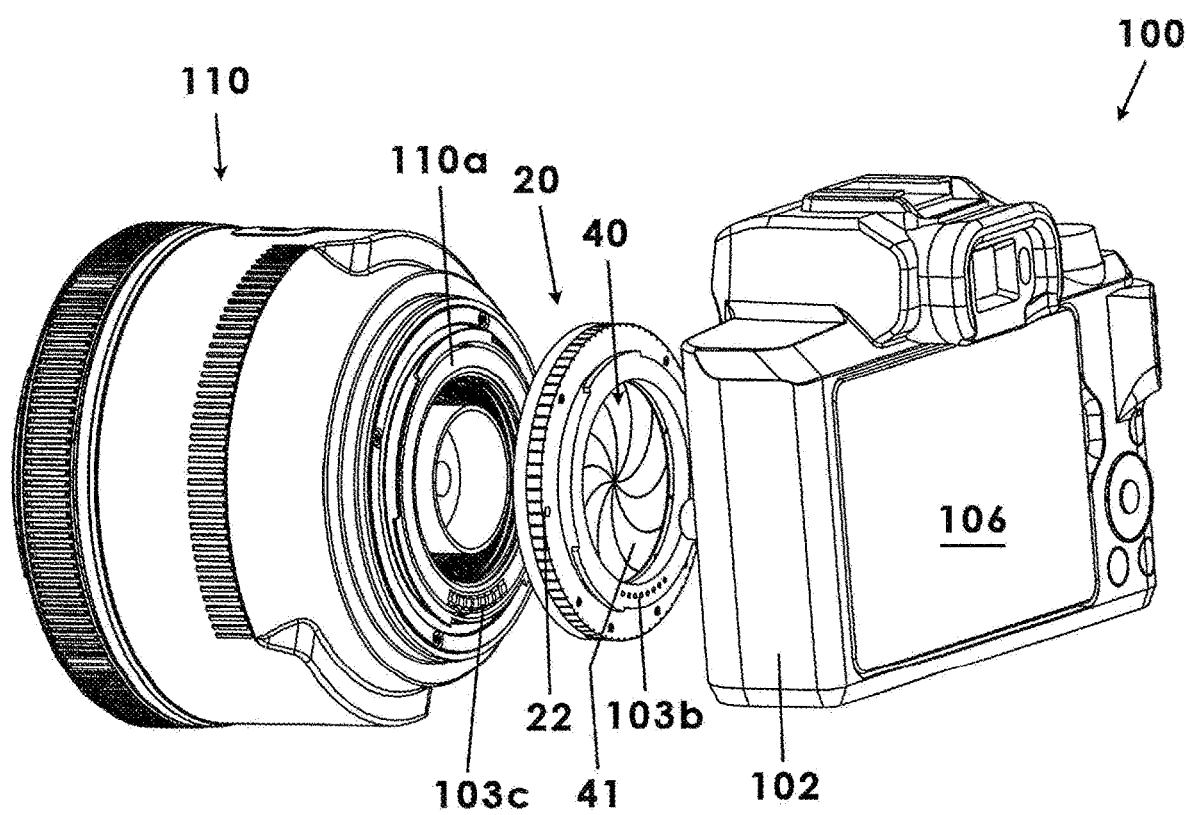
FIG. 3 is an exploded view from a reverse angle of the digital camera and shield assembly as in FIG. 2.

For the sake of clarity, several structures that are characteristic to the digital camera 100 will be described initially. Namely, the digital camera 100 includes a camera body, which will also be referred to as a casing 102 having a plurality of walls that, together, define an interior area for holding traditional camera components such as a battery, a light sensor 104 (also referred to as a photosensor), and other electronics, such as may be hardwired or as software, that, when configured together, collects incoming light waves and convert them to a photograph or video that may be stored in internal or external memory or displayed on a digital display 106 such as is commonly positioned on a rear wall of the casing 102 (FIGS. 1 and 3).

Further, the camera body may include a lens locking ring 108 mounted on a front wall, the lens locking ring 108 having a circular or round configuration that defines a large void 109 or hole through which light waves are collected by said internal sensor during the normal operation of a photograph being taken. It is understood, of course, that ambient air is also allowed to flow or pass through the void from a point outside the interior area of the camera body to a point inside the interior area. And, an uninhibited flow of ambient air through the void defined by the lens locking ring 108 naturally includes dust, dirt, and other contaminants that may be airborne in the air. The natural result of airborne contaminants in the interior area of the casing 102 is that the contaminants will come to rest upon the light sensor 104 which will cause smudges, seemingly out of focus areas, or even holes in photographs generated from the data points/receivers of the sensor 104.

The lens locking ring 108 may be positioned on and coupled to a front wall of the casing 102 and may itself include a front side having at least one camera lens lock pin 108a extending away (i.e., extending forwardly). In a traditional context, a camera lens 110 would include a rear/distal end having a structure complementary to the lens lock pin 108a such that the lens 110 may be selectively coupled to the lens locking ring 108. In an embodiment, a lens 110 may have a distal end 110a that includes what is referred to as a bayonet construction having one or more lugs 112 receivable into a corresponding lug slot 32 defined by the barrier member 20 as will be discussed later.

Preferably, the imaging sensor shield 10, like the one or more telephoto lenses 110 that are attachable to a digital camera 100 as well as the lens locking ring 108, has a barrier member 20 having a ring-like or tubular/cylindrical configuration that may be positioned intermediate the lens locking ring 108 and a camera lens 110. More particularly, the barrier member has a rear surface that includes or defines a detent 22 (FIG. 3) that is configured to mate with the lens lock pin 108a of the lens locking ring 108 (FIG. 2) in a friction fit engagement (FIG. 4). In embodiments of the present invention, the barrier member 20 may be installed and uninstalled in a rotational manner as demonstrated in FIGS. 5a to 5c although other attachment means may be suitable.

Figure 4A:
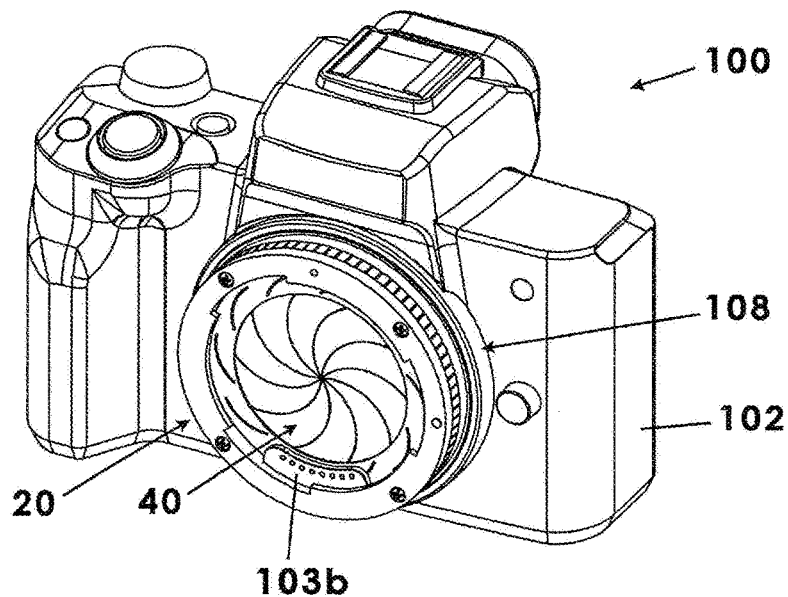
FIG. 4a is a perspective view of the sensor shield member installed on a camera, illustrated with the iris assembly at the closed configuration.
Figure 4B:
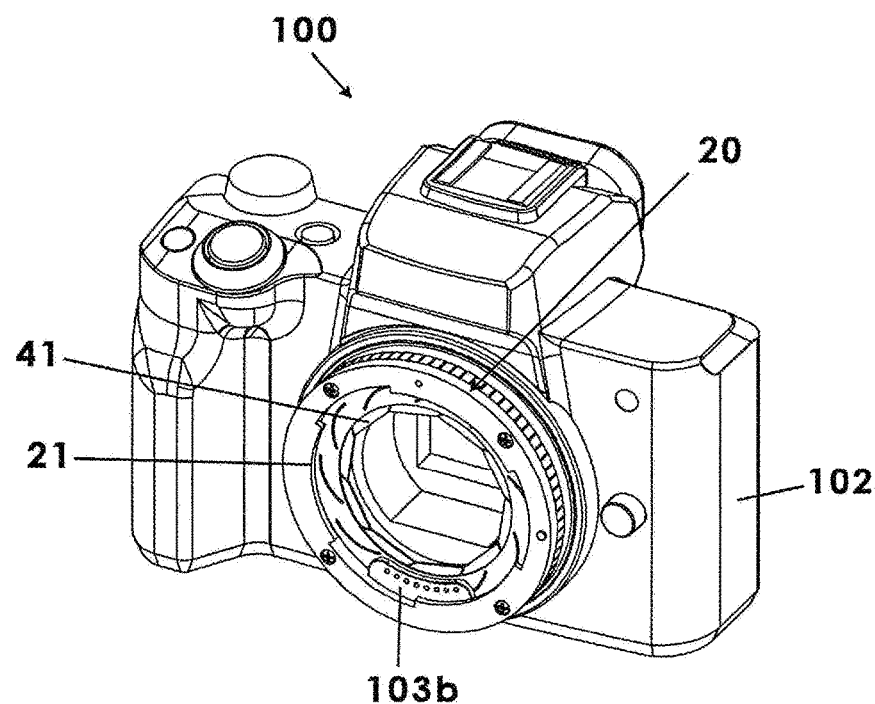
FIG. 4b is a perspective view of the sensor shield installed on the camera as in FIG. 4a, illustrated with the iris assembly at the open configuration.
Figure 5A:
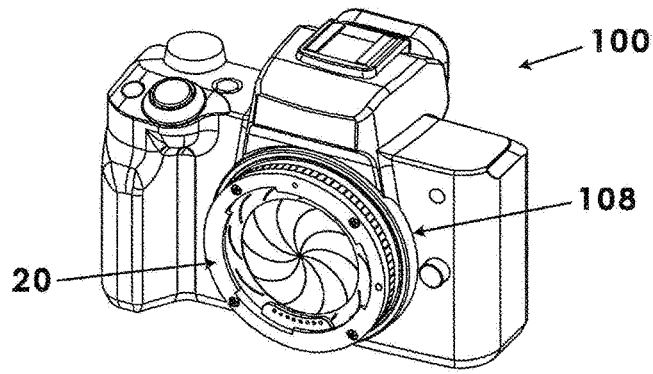
Figure 5B:
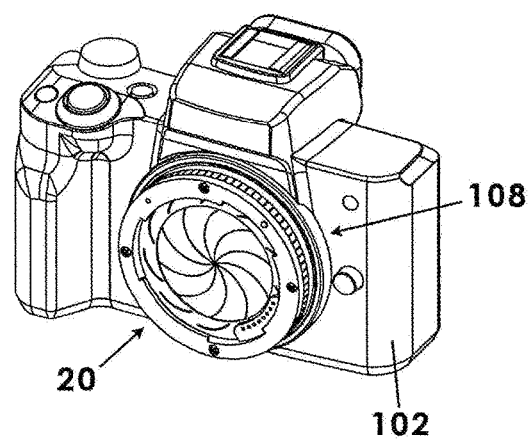
FIG. 5b is a perspective view of the sensor shield member installed on the camera as in FIG. 5a, illustrated with the lens lock depressed so as to release the sensor shield and with the sensor shield partially rotated.
Figure 5C:
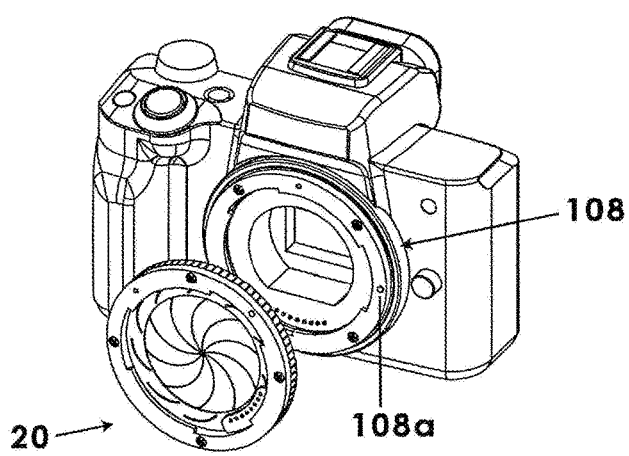
Figure 6A:
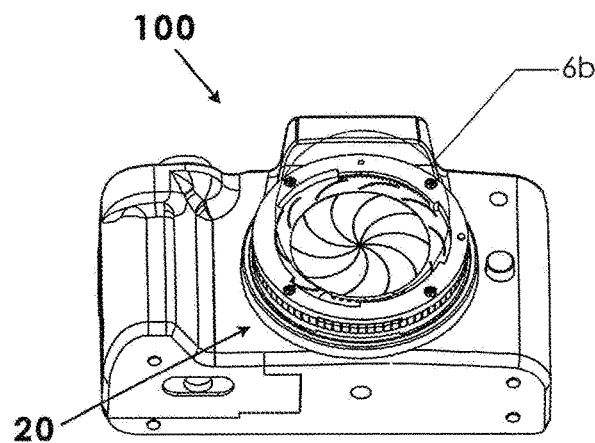
Figure 6B:
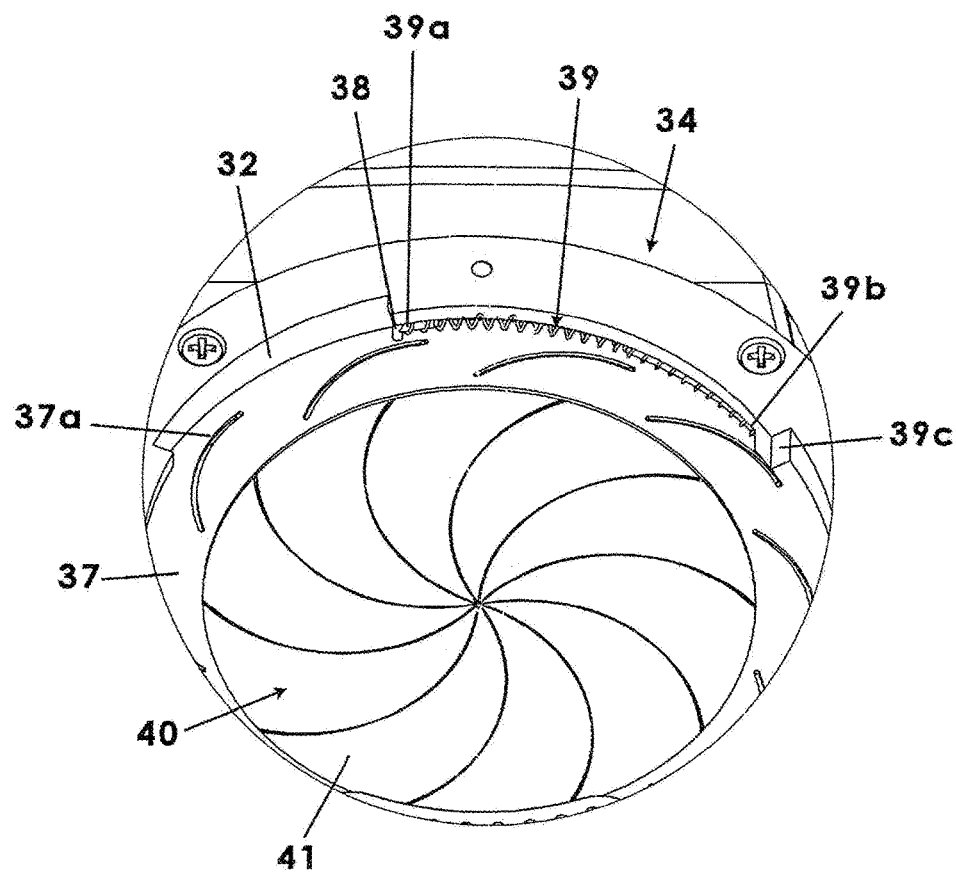
Figure 7A:
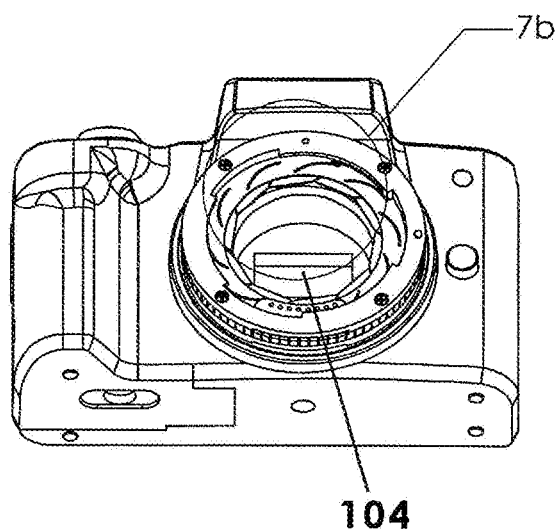
FIG. 7a is a perspective view from a rearwardly tilted angle of the sensor shield member installed on a camera as in FIG. 4b.
Figure 7B:
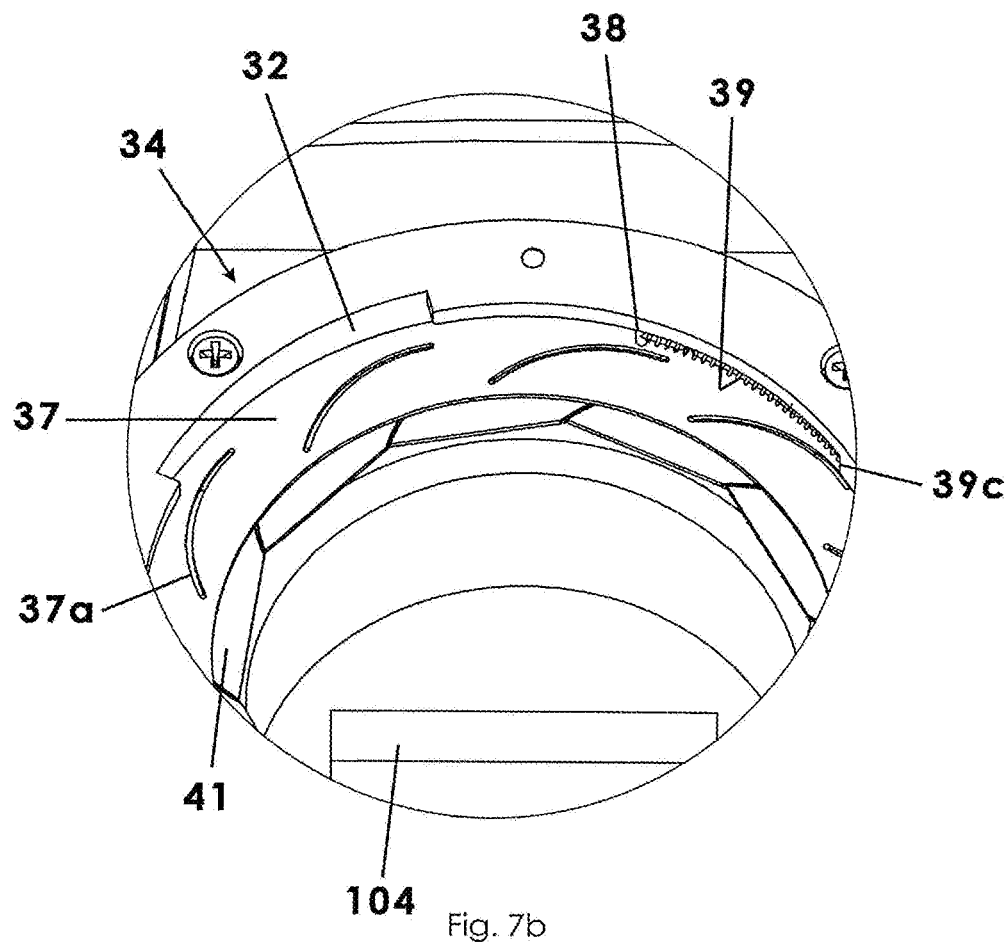
Figure 8A:
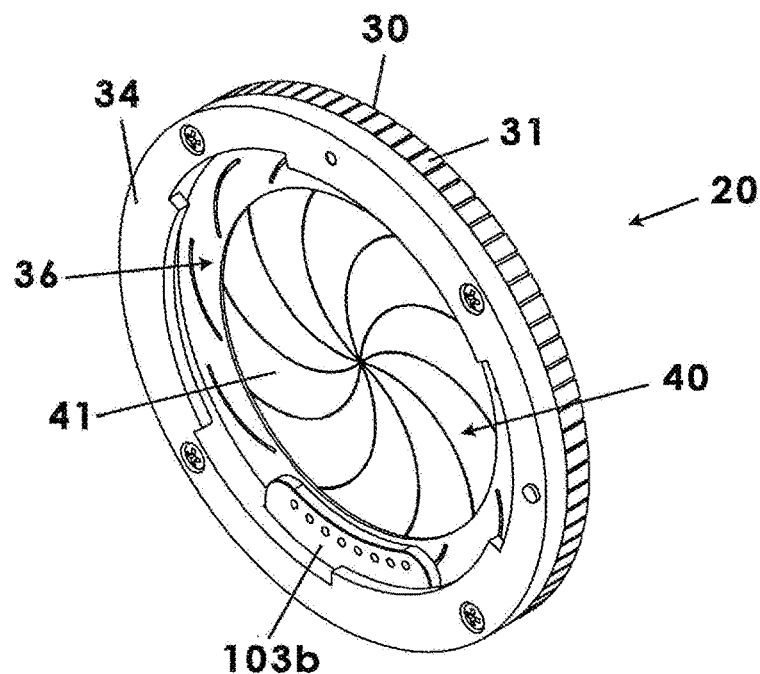
FIG. 8a is a front perspective view of the sensor shield member according to the and is present invention.
Figure 8B:
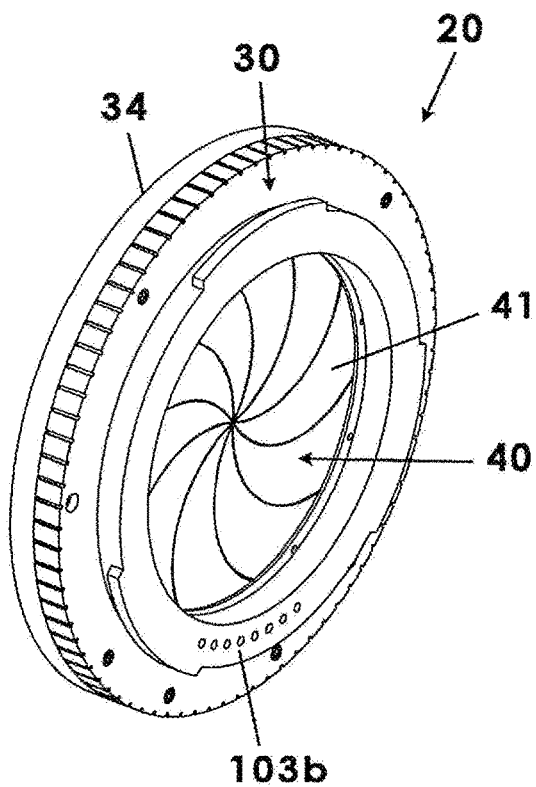

In a critical aspect, the barrier member 20 includes a continuous peripheral edge that defines an aperture 21 which may be configured in either open or closed configurations so as to allow or disallow ambient air to pass therethrough, respectively. More particularly, the barrier member 20 includes an iris assembly 40 having a plurality of iris blades 41 each being rotatably movable between a closed configuration in which the plurality of iris blades 41 are arranged in an overlapping and spiral configuration that is completely closed and prevents ambient air from flowing through the aperture 21 (FIG. 4a) and an open configuration in which the plurality of iris blades 41 are arranged in a rotatably displaced configuration that, when actuated, allows ambient air to flow through the aperture 21 (FIG. 4b). Actuation of the iris assembly 40 will be described later. As shown in FIG. 4b, light waves directed through the void 109 are not affected or inhibited by the iris assembly 40 when actuated to the open configuration.

In a critical aspect, the iris assembly defines a receiving slot 32 configured to receive the distal end 110a of the lens 110 and includes a compression spring 45 positioned in the receiving slot 32. The compression spring 45 is operatively connected (such as with a pen or linkage and corresponding tracks) to the plurality of iris blades such that the plurality of iris blades is resiliently movable to the open configuration (FIG. 4b) when distal end 110a of the lens 110 is selectively received in the receiving slot 32 and rotated in such a manner such that the compression spring 45 is compressed.

In short, the iris assembly 40 is opened when a lens 110 is attached and rotated or, by contrast, the iris assembly 40 is closed when a lens 110 is detached from the barrier member 20 and camera 100.

Figure 9A:
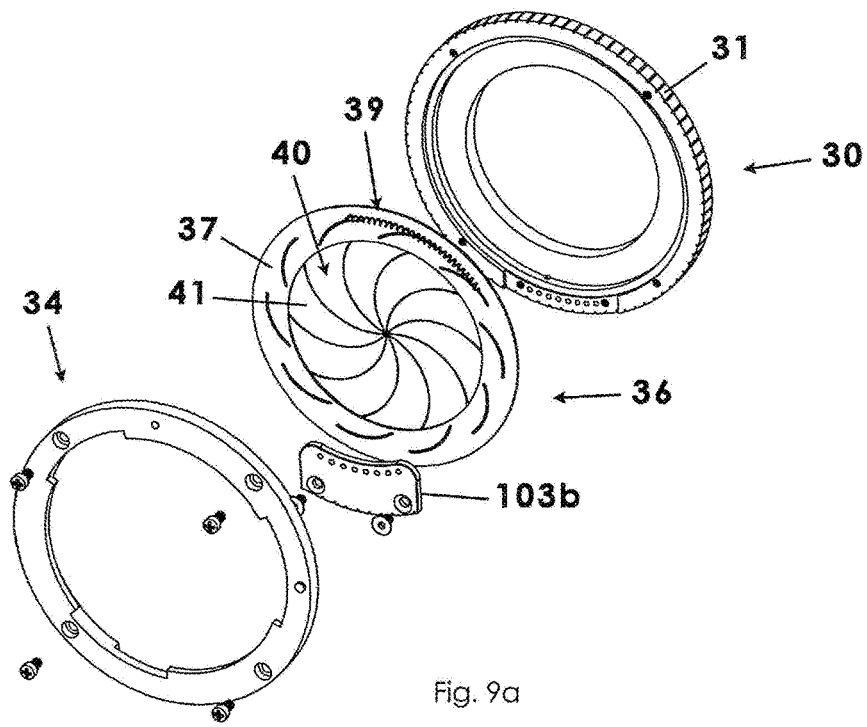
Figure 9B:
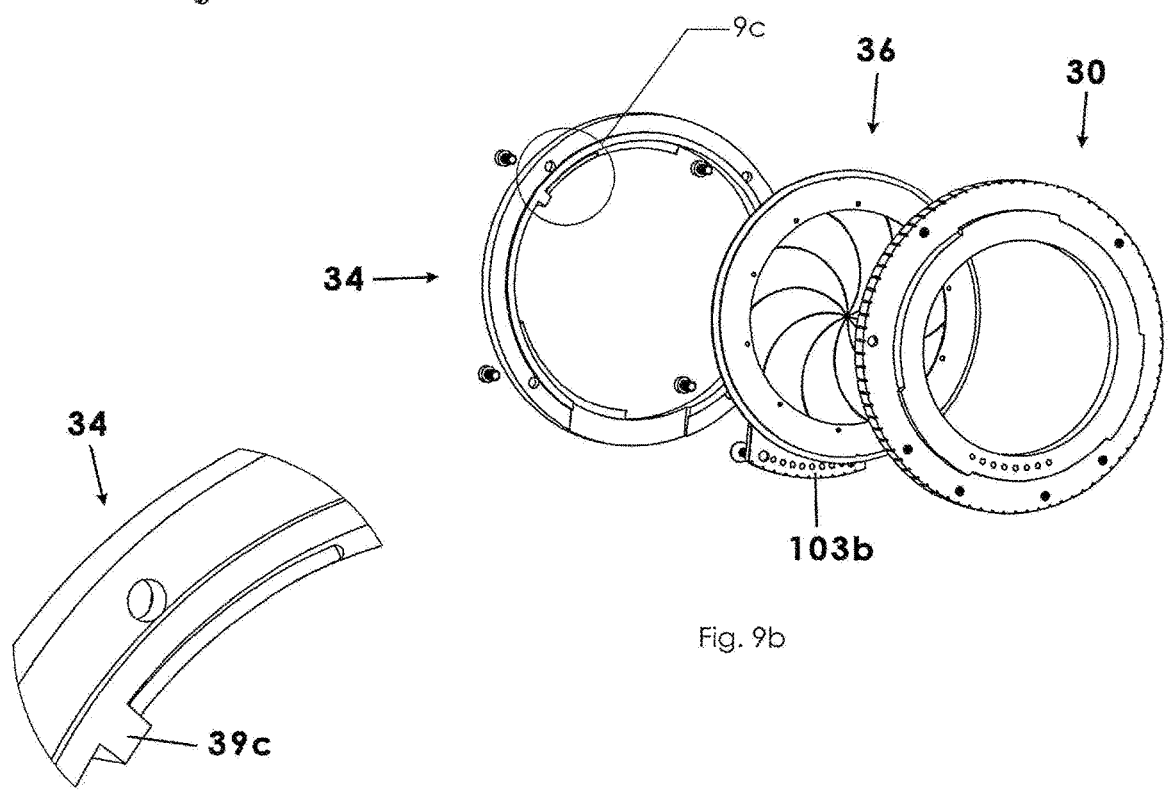
Figure 9C:
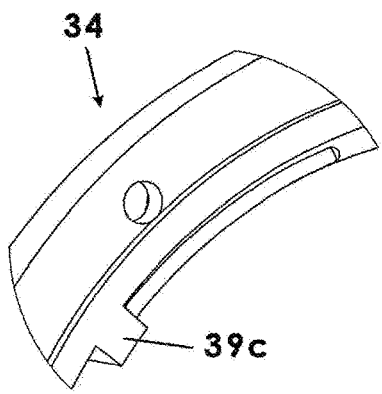
FIG. 9c is an isolated view on an enlarged scale taken from FIG. 9b.
Figure 10A:
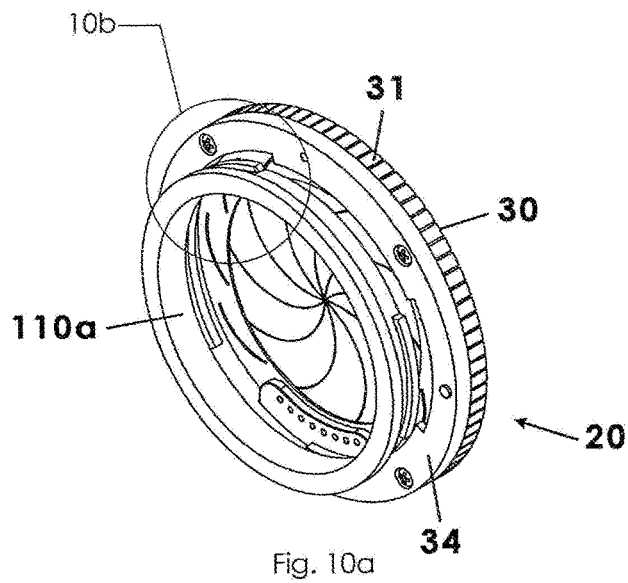
FIG. 10a is a perspective view of the sensor shield member on an enlarged scale, illustrated with only the distal end (e.g., the bayonet and) of a lens attached thereto for the sake of clarity and to show receipt of a lens lug in a lug slot defined by the iris assembly.
Figure 10B:
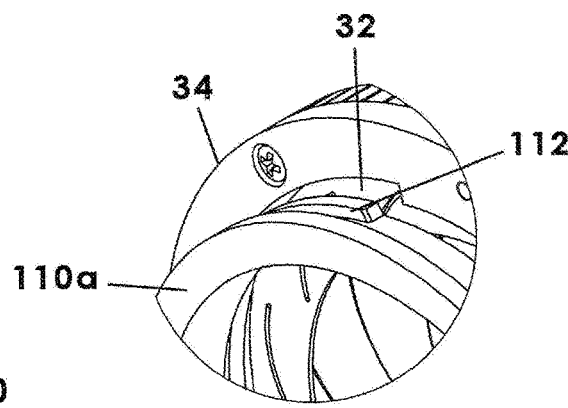
Figure 10C:
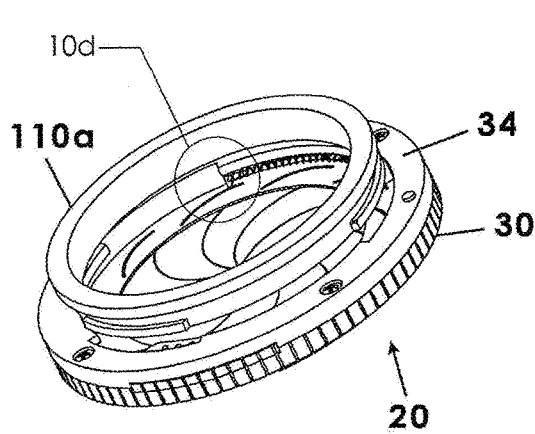
FIG. 10c is another perspective view of the sensor shield member as in FIG. 10a, illustrated at another angle so as to show the iris actuation pin and compression spring.
Figure 10D:
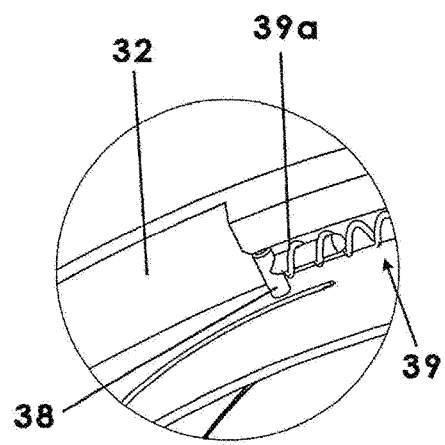
FIG. 10d is an isolated view on an enlarged scale taken from FIG. 10c.
Figure 13:
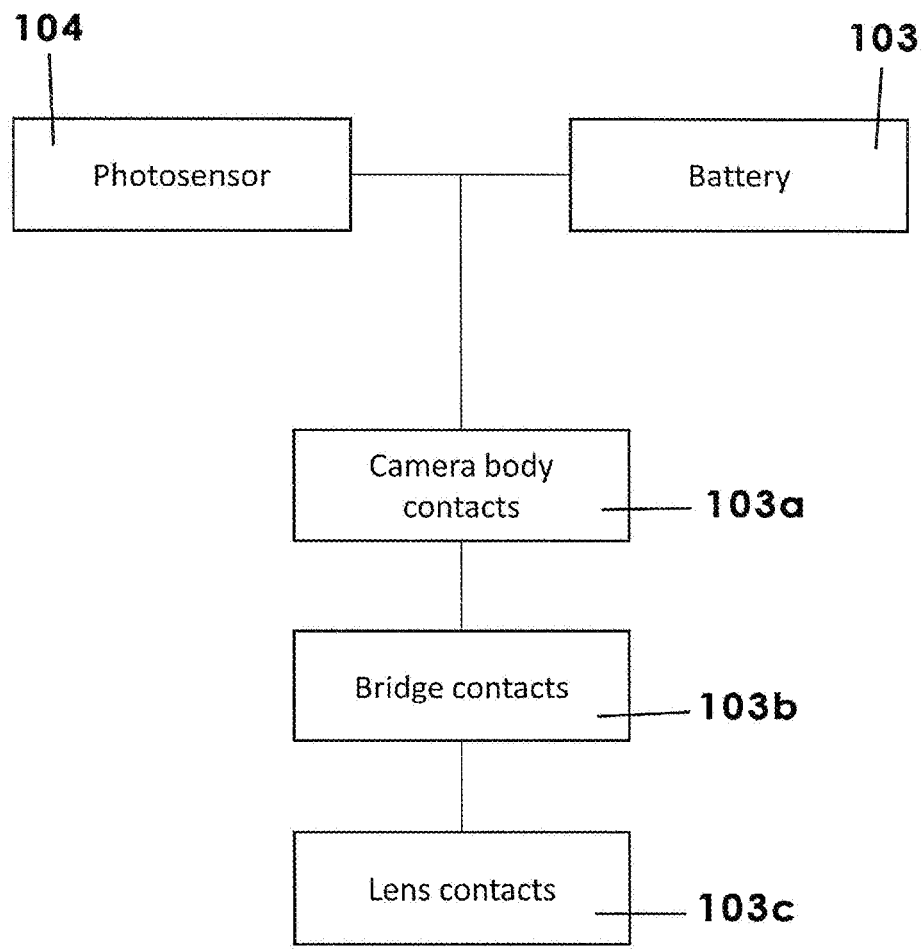
FIG. 13 is a block diagram illustrating the electronic components of the present invention.

Explained in more detail, the barrier member 20 is comprised of three parts, i.e., three rings as shown specifically in FIG. 9. First, the barrier member 20 includes a body plate 30 (also referred to as a barrier body) having a ring-shaped configuration that includes a backside that is open in the manner of defining a bore. The body plate 30 has a circular configuration having a continuous peripheral edge that may define a tactile surface 31 such as having a plurality of ridges that provide increased grip to a user. As shown, a forward side of the body plate 30 may have a recess configuration that includes an interior ledge that is configured to define a lug slot 32 (which may also be referred to as the receiving slot described above), the lug slot 32 being configured to receive a lug 112 structure characteristic of a bayonet construction associated with the distal end 110*a* of a lens 110.

Further, the barrier member 20 may include a lens mount plate 34, also having a circular configuration defining an open center (FIG. 9). The lens mount plate 34 may be fixedly mounted to the body plate 30, such as with screws or similar fasteners. The inwardly recessed configuration of the body plate 30 results in the body plate 30 and lens mount plate 34 two, together, define an interior space importantly, it will be understood that the lens mount plate 34 may have a configuration that is concentrically smaller than a diameter of the body plate 30 so that the distal end 110*a* and lug 112 of a lens 110 will engage the lug slot 32 when the lens 110 is being coupled to the camera 100 (FIGS. 11*a* and 12*a*).

Still further, the barrier member 20 may include an iris plate 36 having a peripheral section 37 and including the plurality of iris blades 41 described earlier, the peripheral section 37 being operatively coupled to the plurality of iris blades 41 such as with a pin or linkage (shown in FIG. 12*c*), the pin configured to travel along a respective track when moved between open and closed configurations as described previously. It is understood that the iris plate 36 may be nested inside the recessed area of the body plate 30 so that its components described below (the iris actuation pin 38 and spring 39 are approximate or adjacent the lug slot 32 as described below and as shown particularly in FIGS. 11*a* to 12*c*.

In addition, the barrier member 20 includes an iris actuation pin 38 coupled to the iris plate 36, the iris actuation pin 38 being preferably positioned proximate an end of the lug slot 32. Still further, the barrier member 20 includes a compression spring 39 having one end 39*a* coupled to the actuation pin 38 and having an opposite end 39*b* coupled to a stop 39*c* which may be a tab within the body plate 30. As will be described in more detail below, the lug 112 associated with the distal end 110*a* of a lens 110, when the lens 110 is rotated (such as during attachment to the camera 100), the lug 112 will urge or rotate the actuation pin 38 which comprises the compression spring 39 toward the stop 39*c*—this action causing the plurality of iris blades 41 to rotate to the open configuration as described previously.

FIGS. 11*a* to 11*c* illustrate the bayonet of a distal end 110*a* of a lens 110 fully inserted into the body plate 30 such that lug 112 is positioned in the lug slot 32 and immediately adjacent the actuation pin 38. The lens 110 is now poised for rotation although no rotation has yet occurred and so the plurality of iris blades 41 are still arranged at the closed configuration (FIG. 11*b*). By contrast, FIGS. 12*a* to 12*c* illustrate the bayonet of a distal end 110*a* of a lens 110 fully inserted into the body plate 30 and rotated such that the lug 112 has pushed or rotated the actuation pin 38 is that the compression spring 45 is now shown in a compressed configuration and such that the iris plate 36 is rotated such that the average blades 41 and likewise rotated to the open configuration (FIG. 12*b*).

It is understood that while certain forms of this invention have been illustrated and described, it is not limited thereto except insofar as such limitations are included in the following claims and allowable functional equivalents thereof.

The invention claimed is:

1. A sensor shield assembly coupled to a digital camera of a type that includes a camera body that defines an interior area and that includes a lens locking ring that defines a void in communication with said interior area, said sensor shield assembly comprising:
   a barrier member having a rear surface removably coupled to a front surface of the lens locking ring of the camera body, said barrier member having a ring-shaped configuration that defines an aperture;
   an iris assembly having a plurality of iris blades positioned in said aperture that is rotatably movable between a closed configuration that prevents ambient air from flowing through said aperture and an open configuration that, when actuated, allows ambient air to flow through said aperture;
   a lens having a distal end releasably coupled to a front surface of said barrier member and is rotatable between an unlocked configuration in which said iris assembly is automatically biased toward said closed configuration and a locked-in configuration that automatically actuates said iris assembly toward said open configuration.

2. The sensor shield assembly as in claim 1, wherein said barrier member includes:
   a body plate having a circular configuration defining an open back and having an interior ledge that defines a lug slot configured to selectively receive the distal end of said lens and having a stop member positioned in said lug slot;
   a lens mount plate fixedly mounted to said barrier body plate that, together define an interior space, said lens mount plate including said front surface configured to receive said distal end of said lens; and
   an iris plate positioned in said interior space intermediate said barrier body plate and said lens mount plate, said iris plate defining a plurality of arcuate tracks operatively connected to said plurality of iris blades.

3. The sensor shield assembly as in claim 2 wherein said barrier member includes:
   an iris actuation pin coupled to said iris plate and positioned proximate said lug slot and configured to be urged along said lug slot when said distal end of said lens is coupled to said lens mount plate and rotated;
   a compression spring positioned in said lug slot, said compression spring having a proximal end coupled to said actuation pin and a distal end adjacent said stop member so that said compression spring is compressed when said lens is coupled to said lens mount plate and rotated.

4. The sensor shield assembly as in claim 3, wherein said plurality of iris blades is configured to move from said closed configuration to said open configuration when said lens is coupled to said lens mount plate and rotated in a first rotational direction and is configured to move from said open configuration to said closed configuration when said lens is coupled to said lens mount plate and rotated in a second rotational direction.

5. The sensor shield assembly as in claim 3, wherein said plurality of iris blades is configured to move from said closed configuration to said open configuration when said lens is coupled to said lens mount plate and rotated in a direction that compresses said compression spring and is configured to move from said open configuration to said closed configuration said compression spring is allowed to expand when said lens is decoupled from said lens mount plate.

6. The sensor shield assembly as in claim 3, wherein said distal end of said lens includes a bayonet configuration having a plurality of lugs each having a configuration that is complementary to said lug slot and receivable therein adjacent the actuation pin such that rotation of the lens, when said distal end is received in a respective lug slot, urges the actuation pin to compress said compression spring and the iris plate to rotate.

7. The sensor shield assembly as in claim 1, wherein:
said barrier member includes a pass-through electrical contact plate that is configured to bridge electrical impulses between the lens locking ring and the lens;
said lens locking ring having a locking ring electrical contact plate in electrical communication with said pass-through electrical contact plate of said barrier member; and
said lens having a lens electrical contact plate in electrical communication with said pass-through electrical contact plate of said barrier member.

8. The sensor shield assembly as in claim 1, wherein the lens locking ring includes a lens lock pin extending away from a front surface thereof and the barrier member includes a detent configured to receive said lens lock pin in a friction fit relationship whereby said barrier member is selectively coupled to said lens locking ring.

9. The sensor shield assembly as in claim 1, wherein said plurality of iris blades are configured in an overlapping spiral configuration when actuated to said closed configuration that is sealed against movement of ambient air through said aperture.

10. The sensor shield assembly as in claim 1, wherein said plurality of iris blades of said iris assembly are immediately and automatically moved to said open configuration if and only if said lens is coupled to said barrier member and rotated.

11. A digital camera, comprising:
a camera body having a casing that defines an interior area and that includes a lens locking ring mounted on a front wall of the casing and that defines a void in communication with said interior area:
a barrier member having a rear surface removably coupled to a front surface of the lens locking ring of the camera body, said barrier member having a ring-shaped configuration that defines an aperture;
an iris assembly having a plurality of iris blades positioned in said aperture that is rotatably movable between a closed configuration in which said plurality of iris blades are arranged in an overlapping spiral configuration that prevents ambient air from flowing through said aperture and an open configuration at which said plurality of iris blades are arranged in a rotatably displaced configuration that, when actuated, allows ambient air to flow through said aperture;
a lens having a distal end releasably coupled to a front surface of said barrier member and that is rotatable between an unlocked configuration in which said iris assembly is automatically biased toward said closed configuration and a locked-in configuration that automatically actuates said iris assembly toward said open configuration.

12. The digital camera as in claim 11, wherein:
said barrier member includes a pass-through electrical contact plate that is configured to bridge electrical impulses between the lens locking ring and the lens;
said lens locking ring having a locking ring electrical contact plate in electrical communication with said pass-through electrical contact plate of said barrier member; and
said lens having a lens electrical contact plate in electrical communication with said pass-through electrical contact plate of said barrier member.

13. The digital camera as in claim 12, wherein said iris assembly defines a receiving slot configured to receive said distal end of said lens and includes a compression spring adjacent said receiving slot that is operatively connected to said plurality of iris blades such that said plurality of iris blades are resiliently moved toward said open configuration when said lens is selectively received in said receiving slot and rotated such that said compression spring compressed.

14. The digital camera as in claim 13, wherein said plurality of iris blades are automatically resiliently moved toward said open configuration when said lens no longer applies compressive force against said compression spring.

15. The digital camera as in claim 11, wherein said barrier member includes:
a body plate having a circular configuration defining an open back and having an interior ledge that defines a lug slot configured to selectively receive the distal end of said lens and having a stop member positioned in said lug slot;
a lens mount plate fixedly mounted to said barrier body plate that, together define an interior space, said lens mount plate including said front surface configured to receive said distal end of said lens; and
an iris plate positioned in said interior space intermediate said barrier body plate and said lens mount plate, said iris plate defining a plurality of arcuate tracks operatively connected to said plurality of iris blades.

16. The digital camera as in claim 15 wherein said barrier member includes:
an iris actuation pin coupled to said iris plate and positioned proximate said lug slot and configured to be urged along said lug slot when said distal end of said lens is coupled to said lens mount plate and rotated;
a compression spring positioned in said lug slot, said compression spring having a proximal end coupled to said actuation pin and a distal end adjacent said stop member so that said compression spring is compressed when said lens is coupled to said lens mount plate and rotated.

17. The digital camera as in claim 16, wherein said plurality of iris blades is configured to move from said closed configuration to said open configuration when said lens is coupled to said lens mount plate and rotated in a direction that compresses said compression spring and is configured to move from said open configuration to said closed configuration said compression spring is allowed to expand when said lens is decoupled from said lens mount plate.

18. The digital camera as in claim 16, wherein said distal end of said lens includes a bayonet configuration having a plurality of lugs each having a configuration that is complementary to said lug slot and receivable therein adjacent the actuation pin such that rotation of the lens, when said distal end is received in a respective lug slot, urges the actuation pin to compress said compression spring and the iris plate to rotate.

* * * * *